United States Patent [19]

Dostoomian et al.

[11] 4,444,516

[45] Apr. 24, 1984

[54] INFRARED TEMPERATURE PROBE FOR HIGH PRESSURE USE

[75] Inventors: Ashod S. Dostoomian, Stoughton; Joseph S. Lord, Walpole; Jeffrey R. Davis, Weymouth, all of Mass.

[73] Assignee: Vanzetti Infrared and Computer Systems, Inc., Stoughton, Mass.

[21] Appl. No.: 345,130

[22] Filed: Feb. 2, 1982

[51] Int. Cl.³ .............................. G01J 5/00; G02B 5/16
[52] U.S. Cl. ................................ 374/131; 350/96.20; 356/44; 374/208
[58] Field of Search ............... 374/121, 129, 130, 139, 374/131; 350/15, 96.15, 96.20; 356/44

[56] References Cited

U.S. PATENT DOCUMENTS

| | | | |
|---|---|---|---|
| 2,020,019 | 11/1935 | Collins et al. | 356/44 |
| 3,051,035 | 8/1962 | Root | 356/44 X |
| 3,162,045 | 12/1964 | Kudelko | 374/131 |
| 3,187,574 | 6/1965 | Mason et al. | 374/130 |
| 3,379,062 | 4/1968 | Lellep | 374/125 |
| 3,745,834 | 7/1973 | Veltze et al. | 374/139 X |
| 4,127,319 | 11/1978 | Forney, Jr. et al. | 350/96.2 |
| 4,294,509 | 10/1981 | Nagao | 350/96.15 |
| 4,342,907 | 8/1982 | Macedo et al. | 374/131 X |

*Primary Examiner*—Daniel M. Yasich
*Attorney, Agent, or Firm*—Sughrue, Mion, Zinn, Macpeak and Seas

[57] ABSTRACT

An infrared temperature probe for high pressure use is in the form of a hollow bolt adapted to be threaded into a complementary threaded aperture in the wall of a pressure vessel with the end thereof disposed flush with the internal surface of the pressure vessel wall. An infrared transparent window is secured in the end of the hollow bolt with one surface thereof disposed flush with the end of the bolt. A bundle of optical fibers is secured within the opposite end of the hollow bolt and a glass rod is mounted within the hollow bolt in operative relation to the window and the optical fiber bundle for transmitting infrared radiation from the window to the optical fiber bundle. The interior of the hollow bolt may be supplied with a circulating cooling liquid or gas. An infrared temperature probe can also be used with a mold having an aperture for receiving an ejector pin wherein the hollow ejector pin is provided with an impact surface at one end and an infrared transparent window in the opposite end for receiving infrared radiation from a hot molded article within the mold when the ejector pin is located within the aperture in the mold. A bundle of optical fibers extends through the hollow ejector pin and is disposed in optical transmitting engagement with the window.

5 Claims, 5 Drawing Figures

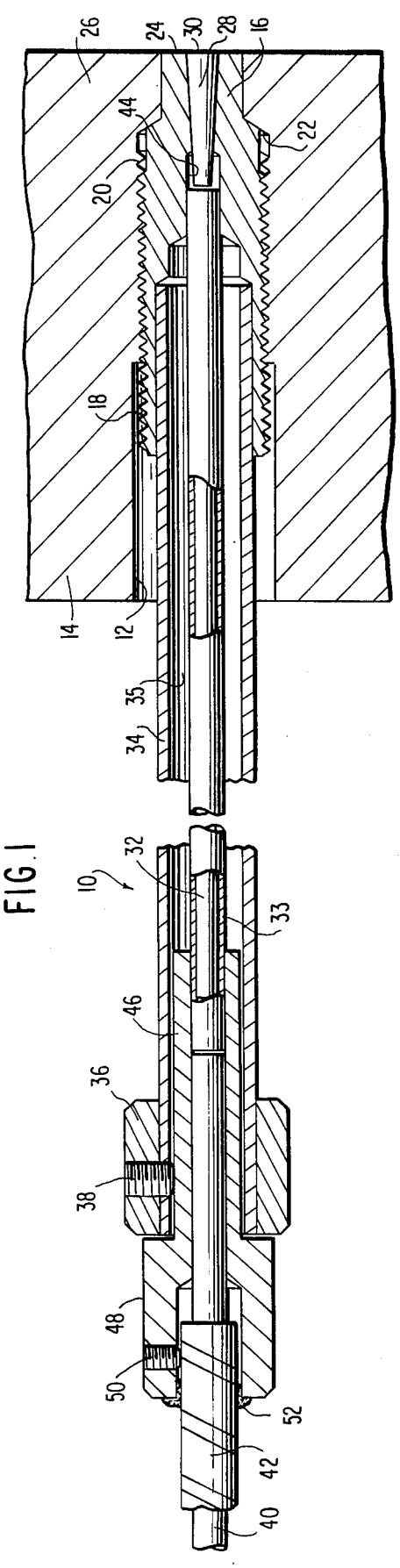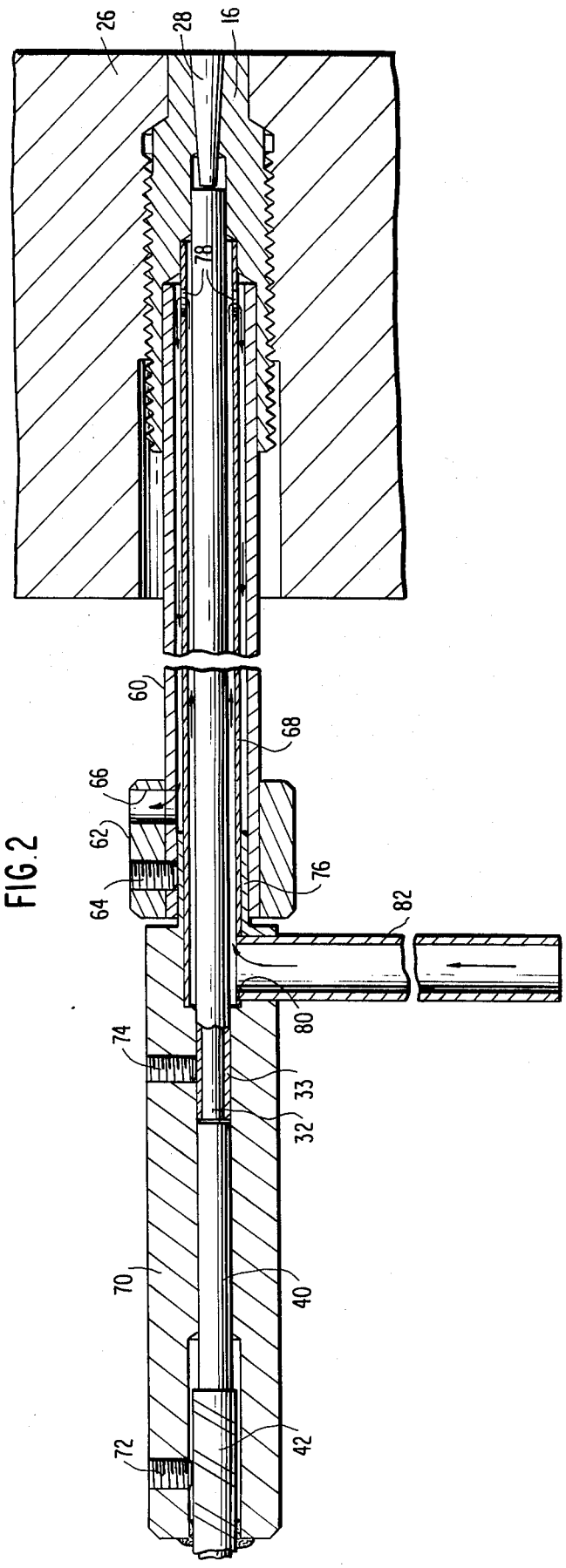

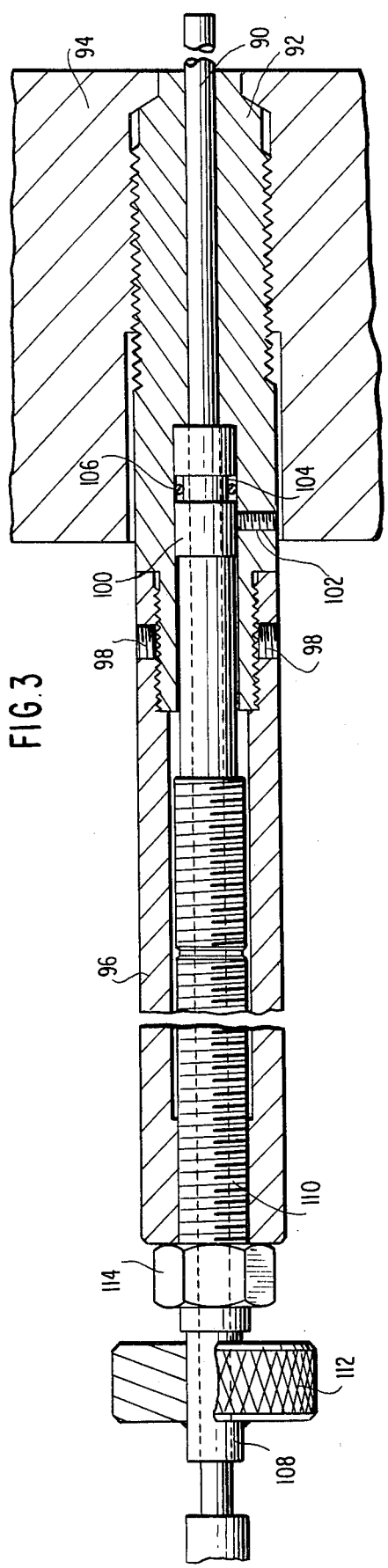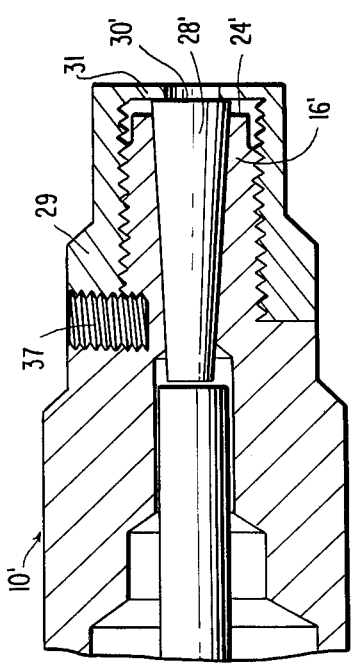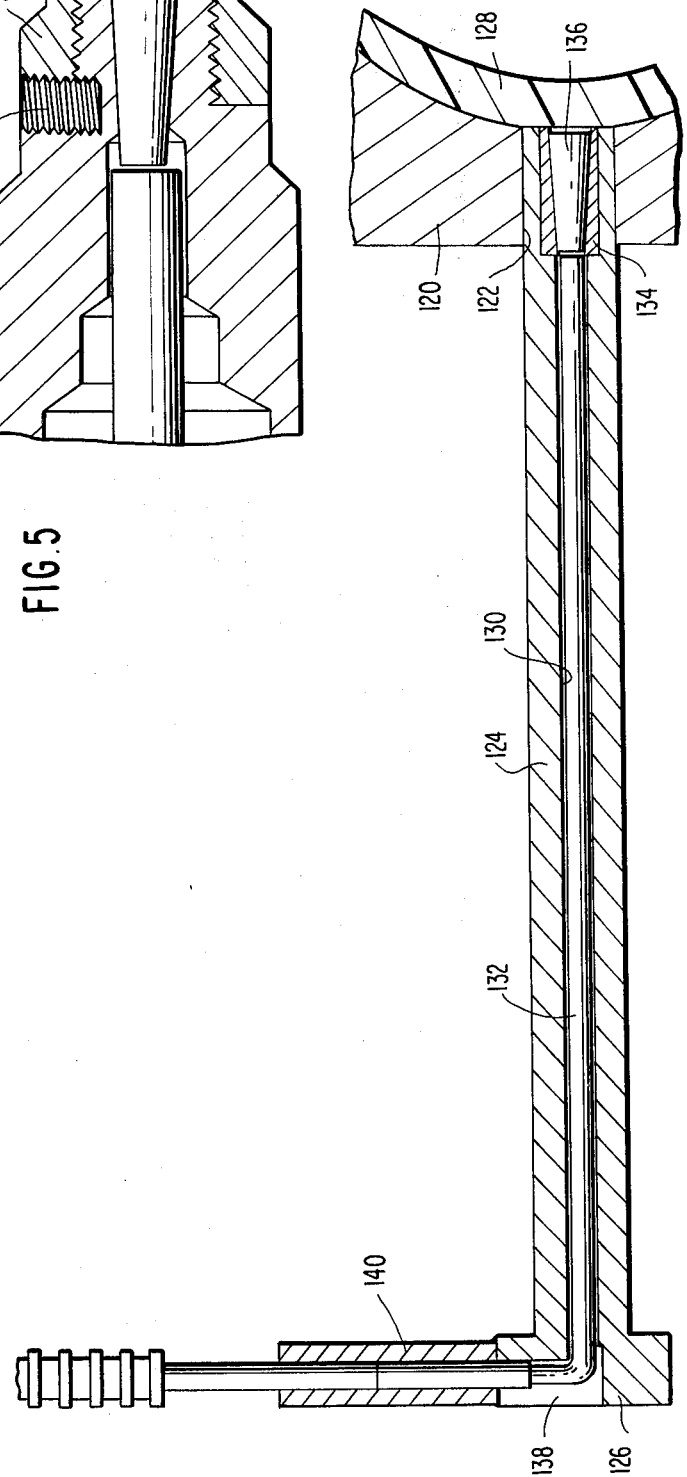

INFRARED TEMPERATURE PROBE FOR HIGH PRESSURE USE

BACKGROUND OF THE INVENTION

The present invention is directed to an infrared temperature probe for high pressure use and more specifically to a probe for measuring the temperature of a contained material, such as molten plastic or metal, when it is under high pressure. Typically, such a material is contained within a pressure-resistant, heated enclosure where it is being processed to change its physical properties or to form it into items of useful shape. An example of such processing might be the melting of plastic resin pellets which are then forced under controlled pressure into useful shapes by injection molding or other melt fabrication processes.

During such a process, it is important that the desired temperature be maintained consistently so that the melt will assume the viscosity needed for optimum throughput and for product quality. Too high a temperature is wasteful of energy, among other disadvantages, whereas too low a temperature can reduce throughput besides changing the quality of the finished product. Unwanted temperature variations in a polymer melt at the time of molding can alter the molecular structure and have adverse effects on the tensile strength, flexural strength, impact resistance and optical characteristics of the finished product.

Traditionally, the melt temperature has been measured by inserting a pressure sealed thermocouple probe into the bulkhead containing the melt whereby the melt temperature may be read remotely by means of the thermocouple signals transmitted over suitable wires. One problem with the thermocouple is that the thermal-junction which generates the signal is contained within a protective metallic housing which is in intimate thermal contact not only with the melt but with the bulkhead as well. This means that it measures a temperature which is somewhere between the temperature of the melt and the temperature of the bulkhead. Identical melt temperatures may thus be read with either positive or negative errors depending upon whether, under the circumstances, the bulkhead happens to be cooler than or hotter than the melt. The latter may be the case either when the melt is being allowed to cool or when heating is carried out by a source external to the containing vessel.

One way to avoid erroneous readings is by the use of longer, thinner thermocouple probes whereby the junction is immersed deeper into the melt. The thinner probe reduces heat contact with the bulkhead but also reduces the resistance of the probe to shear forces during plastic flow which often leads to sheared-off probes. Besides temperature errors and fragility, thermocouples are subject to delays in coming to thermal equilibrium with the melt due to the mass of the protective housing. Thus, they register temperature changes relatively slowly compared with other means of temperature measurement.

Another inherently faster method of measuring temperature is an optical one utilizing the infrared radiation which is emitted by hot surfaces in amounts proportional to their temperatures. The measurement of temperatures by means of optical radiation is a well known art and is described extensively in the technical literature. A review of this technique and of its variations is presented by G. A. Hornbeck in Applied Optics, Vol. 5, No. 2, pages 179-186 (Feb. 1966) under the title "Optical Methods of Temperature Measurement." It is also known that infrared radiation can be conducted from the source to an infrared detector via an optical fiber bundle. Such a method is disclosed in U.S. Pat. No. 3,867,697 to Vanzetti et al.

SUMMARY OF THE INVENTION

The present invention provides an improved optical method utilizing the infrared radiation which is emitted by a hot source in an amount proportional to the temperature thereof wherein the infrared radiation is conducted from the source to an infrared detector via an optical fiber bundle. By using the optical method of temperature measurement, the field of view of the sensing system is easily confined to the desired target area so that the temperatures of surrounding parts are not registered inadvertently. By such means it is possible to avoid including the temperature of the vessel walls in the measurement of the material contained within the vessel. Also since optical radiation signals are transmitted from the target to the detector at nearly the speed of light and since detectors can be used with response times of 0.001 second or less the optical method is considerably faster than the thermocouple method.

The present invention provides an improved optical method of temperature measurement wherein the probe which is mounted in the vessel wall and which receives the target radiation may be mounted flush with the inner surface so that there is no problem of probe rupture due to plasticflow shear forces. An advantage of optical temperature measurement is realized when the measured material is partly optically transmitting in the wavelength range being used as is often the case with plastic melts in an extruder or in an injector. In such a case, the optical probe is able to "look into" the melt for some measurable depth thus yielding a temperature reading which is more nearly representative of the melt temperature. Additionally, where it is desired to extend the probe more deeply into the melt in order to read interior temperatures there is no constraint requiring the probe to be thin in order to reduce thermal conduction. Therefore, it may be made as massive as necessary in order to resist the shear forces.

The present invention provides a new and improved arrangement for utilizing the optical method of temperature measurement for measuring molten plastic polymer temperatures. It is understood however, that it is also within the scope of the present invention to apply the arrangement for the measurement of temperatures of other fluid materials including molten metals, liquids, granular solids, gases where there is a pressure differential between the material to be measured and the external environment containing the measuring apparatus. In referring to a pressure differential, the only implication is that the material to be measured is at either a higher or a lower pressure than the environment.

In the apparatus according to the present invention, the infrared radiation emitted by the material is transmitted to the radiation detector via a flexible bundle of infrared-transmitting optical fibers. The fibers are isolated from the pressure/vacuum environment by a transparent window of suitable mechanical properties. The window is pressure sealed into a metallic or other rigid housing which is in turn sealed to an opening which is provided for it in the bulkhead. The optical fiber bundle is contained within a flexible protective sheath and replaces the electrical wiring which would ordinarily be used in conveying signals remotely. The use of such bundles provide immunity from stray electromagnetic radiation such as due to the operation of nearby electrical devices. Such radiation or "electrical noise" often interferes with low level signals, such as from thermocouples, which are conveyed over wires. Although optical fiber bundles are often contained within flexible metallic jackets the metal can be eliminated in favor of plastic tubing in environments where electrical noise is a problem.

The apparatus according to the present invention is in the form of a hollow bolt through which the optical fibers extend and are optically coupled to the window secured in one end of the bolt. The outer end of the window is adapted to be disposed flush with the interior surface of the pressure vessel upon threading of the bolt into an aperture in the wall of the pressure vessel. The bolt may also be provided with interior passages for the circulation of a cooling fluid.

A modified apparatus according to the present invention includes a hollow bolt having an extendable and retractable infrared transmitting glass rod slidably mounted therein for insertion into the material to be measured within the pressure vessel.

Another modified form of the present invention contemplates forming an ejector pin of the type suitable for use in a mold with an optical pressure resistant window at one end thereof and an infrared transmitting glass rod coupled thereto and extending outwardly through one side of the ejector pin adjacent the impact end thereof. Thus, the temperature of the article in the mold may be accurately sensed so that it can be determined when the article may be safely ejected from the mold by impacting the ejector pin.

The foregoing objects, features and advantages of the invention will be apparent from the following more particular description of preferred embodiments of the invention as illustrated in the accompanying drawings.

BRIEF DESCRIPTION OF THE DRAWINGS

FIG. 1 is a longitudinal sectional view of an infrared temperature probe according to the present invention with the probe secured within the wall of a pressure vessel.

FIG. 2 is a longitudinal sectional view of a modified infrared temperature probe according to the present invention wherein interior passages are provided for the flow of a cooling medium.

FIG. 3 is a longitudinal sectional view of another modified infrared temperature probe having an infrared transmitting glass rod slidably disposed within the probe for extension and retraction into and out of the interior of a pressure vessel.

FIG. 4 is a longitudinal sectional view of still another modified infrared temperature probe incorporated in an ejection pin located within the casing of a mold.

FIG. 5 is a partial longitudinal sectional view of a modified arrangement for securing an infrared transparent window in the end of a bolt.

DETAILED DESCRIPTION OF THE INVENTION

FIG. 1 shows a high pressure infrared temperature probe which for illustrative purposes, is depicted as a probe for measuring molten plastic polymer temperatures. The high pressure infrared temperature probe 10 as shown in FIG. 1 can be referred to as a polymer bolt since it is adapted to be threaded into an aperture 12 in the wall of a pressure vessel 14 adapted to contain a polymer melt. The polymer bolt 10 is geometrically shaped and comprised of a tip portion 16 having external threads 18 formed thereon for complimentary engagement with the threads 20 formed on the interior surface of the bore 12. The bore 12 is formed with a tapered shoulder 22 which limits the threaded engagement of the tip 16 within the bore 12 so that the end surface 24 of the tip 16 will be flush with the interior surface 26 of the pressure vessel wall which, for example, could be a plastic extrusion device. An infrared-transparennt window 28 is sealed into a tapered bore in the tip 16 of the bolt 10. The end face 30 of the window 28 is flush with the end face 24 of the tip 16. The infrared-transparent window 28 is preferably fabricated from sapphire which is extremely hard, being second only to diamonds of all known materials. Despite its hardness, sapphire can be ruptured or chipped at points of high stress concentration. In plastic molding operations, pressures of the order of 30,000 pounds per square inch (psi) are generally used. In order to distribute such high stress on the sapphire window 28, the window is provided with a truncated conical configuration since the tapered walls provide a bearing-surface area much larger than the area of the window exterior where the window pressure is initially developed. The tapering also helps to ensure an increasingly tighter seal at higher external pressures, especially during thermal cycling when the metal expands and then, upon cooling, contracts even more tightly about the window which can be presumed to move inward slightly during heating. A 3° included angle is preferred for the cone taper but the value may be varied by a few degrees.

In the event that the temperature probe should be used with an evacuated instead of a pressurized container, the direction of tapering of the window and its seat may be reversed with the window being installed from inside the probe. However, the advantage of tapering is less in the vacuum case where pressure differentials no greater than about 15 psi, with respect to room temperature, are developed. In this case, conventionally mounted windows could be used.

If the environment is such that reversals between positive and negative pressures occur, the infrared transparent window may be secured in the end of the bolt as shown in FIG. 5. According to this arrangement the window 28' extends beyond the end surface 24' of the tip 16' of the bolt 10' and the external surface of the reduced diameter portion of the tip 16' is threaded. A retaining ring 29 is threaded on the end of the tip 16' and is provided with an annular flange 31 which engages the end surface 30' of the window 28' about the edge thereof. A set screw 35 provides additional securement for the retaining ring 29. The outer surface of flange 31 would be disposed flush with the internal surface of the pressure vessel.

The bolt 10 is provided with a tubular shank 34 of stainless steel which is rigidly secured within the end of the tip 24 which is also constructed of stainless steel. An optical system for transmitting the radiation received through the window 28 is secured within the shank 34 in operative relation to the window 28.

The optical system is comprised of an optical fiber bundle 40 which is contained within a flexible protectable sheath 42 and replaces the wiring which would ordinarily be used in conveying signals remotely from a conventional temperature probe. The use of such bundles is well known in the art and can offer the advantage of immunity to stray electromagnetic radiation such as that due to the operation of nearby electrical devices. Such radiation or electrical noise often interferes with low-level signals such as from thermocouples which are conveyed over wires. Although the optical fiber bundles are often contained within flexible metal jackets, the metal can be eliminated in favor of plastic tubing in environments where electrical noise is a problem. By this means, the possible pickup of noise by the jacket is avoided. A fitting 48 is provided for coupling the optical fibers to the polymer bolt 10. The fitting 48 is provided with a reduced diameter portion 46 which is inserted within the tubular shank 34 and secured therein by means of set screw 38. The bundle of optical fibers 40 extends partially into the reduced diameter 4 in the sleeve portion 46 of the fitting 48 and is secured therein by means of a set screw 50 which bears against the sheath 42 in the larger diameter portion of the bore. A suitable sealing compound 52 seals the opening in the bore surrounding the sheath 42. A glass rod 32 is disposed in abutting engagement with one end thereof with the smaller diameter end of the tapered window 28. The opposite end of the glass rod 32 extends into the bore located in the sleeve 46 of the fitting 48 for optically coupling the window 28 to the optical fibers 40. The glass rod is surrounded by a metal tube 33 with a very small air gap there between. An air gap 35 is maintained between the glass rod and the tubular shank 34 to provide thermal insulation for the glass rod. The walls of the glass rod 32 are optically polished so that by total internal reflection, virtually all the radiation which enters the receiving face is transmitted to the exit face which is spaced from the ends of the optical fibers 40 by means of a very slight gap. The confinement of the signal by the walls of the rod is the same phenomenon whereby the individual optical fibers convey radiation from end-to-end with little loss except for slight possible absorption within the material itself.

From an optical standpoint, the rod 32 functions identically to the fibers and in principle could be eliminated if the fibers 40 where to extend through the bolt to the window 28. The reason for not doing so has to do with the means by which the fiber bundle end face 40 is fabricated. Within most of the length of the fiber bundle cable 40, the fiber strands lie loosely like silk threads and are not connected to one another. At both end faces, however, the fibers are cemented together to form a solid mass for a short distance. The purpose of solidifying the end faces is to allow them to be optically ground and polished so that radiation may be coupled through them efficiently. Any of a number of cementing materials may be used for this purpose, such as various epoxy resins which are widely available. However, most of the binding materials which would be advantageous for this use suffer from upper-temperature limitations in the vicinity of the melt-sample temperature. At such temperatures, certain of the binder ingredients can volatize and oxidize forming discolored deposits on the fiber ends or on the window interior. For this reason, it is desirable to locate the fiber end face at the exit end of the bolt 10 where the temperature is lower.

Typically, the optical fibers 40 and the optical rod 32 may be composed of the same infrared-transmitting material, an example being highly pure silicon dioxide or "silica", which is called quartz when it is found in nature. The spectral transmission capability of this material is sufficient for detecting plastic-melt temperatures, for example, starting at about 200° F. to any higher value. Temperature at which plastic molding is carried out is typically in the 400° F. range.

It is a property of optical materials that, when they become sufficiently heated, they themselves can "self-radiate" or emit infrared signals which are then added to those from the target of interest. This is especially true in the wavelength regions where the optical material is a poor transmitter, meaning that it becomes a good emitter instead. This property can be detrimental to the accuracy of optical temperature measurements when the optical elements are exposed to temperatures close to the target temperature.

The self-radiation problem is overcome with the apparatus according to the present invention by using materials which are well known for good infrared transmittance. Therefore, the glass rod 32 within the bolt is preferably fabricated from sapphire or quartz which are noted for their mechanical durability and their resistance to temperature and other environment defects as well as being good infrared transmitters. If the forward end of the rod should become sufficiently heated as to emit radiation in the spectral absorption regions, such radiation will not be transmitted by the optical fibers because of their shorter wavelength cut-off.

Another means of eliminating the self-radiation problem is by use of a cooling stream of purge air or other fluid through the bolt as disclosed in the embodiment of FIG. 2. In this embodiment the tip portion 16 and the optical window 28 are substantially identical to the corresponding elements in the embodiment of FIG. 1, the only differences being the internal dimensions of the bore within the tip 16. A hollow tubular shank 60 is secured within the end of the tip 16 and is provided witth a head 62 secured to the outer end thereof by means of a screw 64. A bore extends radially inwardly through the head and shank to communicate with the interior of the hollow tubular shank 60. A hollow tubular sleeve 68 is also secured within the tip 16 and is disposed in concentric radially inwardly spaced relation relative to the hollow tubular shank 60. A glass rod 32 encased in a metal tube 33 is disposed in concentric spaced relation within the sleeve 68 in optical contact with the window 28. A fitting 70 is provided with a stepped bore extending the length thereof for receiving the optical fibers 40 and the glass rod 32 in substantial abutting relation to each other similar to the arrangement shown in FIG. 1. The optical fibers 40 are secured within the bore of the fitting 70 by means of the set screw 72 which bears against the sheath 42 surrounding the optical fibers 40 and is secured to the glass rod 32 by means of a set screw 74 which bears against the metal tube 33. The fitting 70 is provided with a tubular extension 76 which extends into the polymer bolt between the shank 60 and the sleeve 68 and is secured therein by means of a screw 64. The sleeve 68 is provided with a plurality of apertures 78 adjacent the end closest to the window 28 to communicate the annular space between the glass rod and the sleeve 68 with the annular space between the sleeve 68 and the shank 60. The opposite end of the sleeve 68 is provided with an aperture 80 into which a nipple 82 is secured which in turn is adapted to be connected to a source of air under pressure. A flow of cooling air enters through the nipple 82 and travels in the direction of the arrows through the annular spaces concentric with the glass rod 32 before being exhausted through the bore 66. This cooling stream of air assists in preventing self-radiation due to overheating of the rod.

It is also possible to overcome the rod self-emission background problem by means of optical filtering. If the rod is composed of a material similar to that of the fibers, any radiation emitted by heated parts of the rod may be blocked by use of a suitable optical filter (not shown) interposed between the output end of the rod and the receiving end of the fiber bundle or elsewhere in the detection path. The use of optical filters for such purposes is well known in the art. A filter need merely be selected with good optical transmittance in most of the wavelength region in which the fibers transmit and with poor transmission in the longer wavelength region in which the rod transmits. By this means, one artifically shortens the cut-off wavelength of the fibers. This results in raising the minimum detectable temperature of the optical system because it requires higher target temperatures for efficient detection which is not always a desirable result. However, where target temperatures are sufficiently high, optical filter method is a convenient way of reducing the self-emission background.

There are some situations in which the user has occasion to measure temperatures at various depths within the melt or other medium so that he may determine temperature gradient or how uniformly the material is heated. In such cases, the probe according to the present invention can be comprised of a sliding member containing the optical rod, which member is contained within a fixed outer body which is secured to the chamber bulkhead with a sliding seal between the fixed and movable bodies. Such an arrangement is shown in FIG. 3 wherein a stainless steel encased glass rod 90 is slidably disposed within a fitting 92 threaded in an aperture in the wall 94 of the pressure vessel containing the melt or other material, the temperature of which is to be measured. The fitting 92 is provided with a hollow tubular extension 96 which is threaded onto the ends of the fitting 92 and secured in assembled relation by means of set screws 98. The stainless steel clad glass rod 90 slidably extends through a sealing member 100 which is secured within the fitting by means of a set screw 102. The sealing member 100 is provided with an annular groove 104 having a sealing ring 106 of any suitable material located therein to prevent the leakage of molten material from the fitting. The stainless steel clad glass rod 90 is secured to an elongated sleeve 108 having a central threaded portion 110 which is disposed in threaded engagement with the interior of the fitting extension 96. A knurled knob 112 is secured to the outermost end of the sleeve 108 and upon rotation of the sleeve 108 and the stainless steel clad glass rod 90 the threaded connection between the portion 110 of the sleeve and the fitting extension 96 will cause the end of the glass rod to be extended or retracted into or out of the material contained within the vessel 94. A locknut 114 is threaded on the sleeve 108 to be moved into and out of abutting engagement with the fitting extension 96 to secure the glass rod in adjusted position. The glass rod 90 is coupled to a cable of optical fibers similar to the manner disclosed with respect to the embodiments shown in FIGS. 1 and 2. While the glass rod is covered along the axial length thereof by means of the stainless steel cladding, the end of the glass rod within the vessel 94 will be uncovered so as to be in contact with the material within the vessel. Likewise, the opposite end of the stainless steel clad glass rod will be exposed for coupling to the optical fibers of the cable.

A further embodiment is shown in FIG. 4 wherein the optical probe according to the present invention can be used in conjunction with a mold for sensing the temperature of the molded article to determine when the molded article is ready for ejection from the mold. In this embodiment, the mold 120 is provided with an aperture 122 adapted to receive an ejector pin 124 which is slidably disposed therein. A ejector pin is provided with an impact surface 126 at one end for ejecting the molded article 128 from the mold 120 after the molded article has cooled to a predetermined degree. The ejector pin is provided with a hollow bore 130 for receiving a flexible bundle of optical fibers 132 arranged in cable form. The bore 132 is provided with an enlarged portion at one end for receiving a support sleeve 134 having a tapered bore for reciving a tapered shapphire cone. The larger diameter end of the sapphire cone is disposed approximately flush with the end of the ejector pin 24 but is spaced slightly inward thereof to prevent damage during the ejection operation. The sapphire cone, however, is disposed in sufficient proximity to the molded article to receive and transmit the infrared radiation from the hot molded article. The infrared radiation is transmitted through the sapphire cone 136 and the optical fiber bundle 132 to a suitable detector for determining the temperature of the molded article.

The end of the ejector pin 124 having the impact surface 126 is provided with a recess 138 which enables the bundle of optical fibers 132 to be turned at right angles for exit through a suitable guide sleeve 140. In this way, the tool for driving the ejector pin 124 will not damage the optical fiber bundle 132 upon impacting against the surface 126. When the molded object 128 has cooled sufficiently to permit its ejection from the mold 120, the ejector pin can be driven manually or automatically to eject the molded article. Thus, there is no danger of ejecting the molded article permaturely or wasting valuable time by retaining the molded article in the mold longer than necessary.

While the invention has been particularly shown and described with reference to preferred embodiments thereof, it will be understood by those in the art that the foregoing and other changes in form and details may be made therein without departing from the spirit and scope of the invention.

What is claimed is:

1. An infrared temperature probe for high pressure use comprising a hollow bolt means adapted to be threaded into a complimentary threaded aperture in the wall of a pressure vessel, said hollow bolt means being grometrically shaped so as to bring the end flush with the internal surface of the pressure vessel wall, an infrared transparent window comprised of a truncated sapphire cone sealingly secured in an end aperture in the end of sad hollow bolt means with the larger diameter surface thereof disposed adjacent said end of said bolt, means for supporting the conical surface of said cone over substantially the entire length thereof, a bundle of optical fibers secured within the opposite end of said hollow bolt means and a glass rod mounted within said hollow bolt means in operative relation to said window and to said optical fiber bundle for transmitting infrared radiation from said window to said optical fiber bundle.

2. An infrared temperature probe as set forth in claim 1, wherein said glass rod is made of quartz and means are provided for supporting opposite ends of said glass rod in close proximity to said window and said optical fiber bundle with the principal portion of the length of said glass rod being disposed in spaced concentric relation to said bolt means.

3. An infrared temperature probe as set forth in claim 2, further comprising means for circulating cooling air along substantially the entire length of said glass rod in the space between said glass rod and said bolt means.

4. An infrared temperature probe as set forth in claim 1, further comprising retaining means secured to the end of said bolt means in engagement with the larger diameter end face of said cone to assist in securing said cone to said bolt means.

5. An infrared temperature probe as set forth in claim 1, wherein sad glass rod is surrounded by a metal tube with a small air gap therebetween.

* * * * *